June 17, 1924.  
J. H. WRIGHT  
1,498,336  
VEHICLE WHEEL TIRE AND CASING  
Filed July 19, 1921
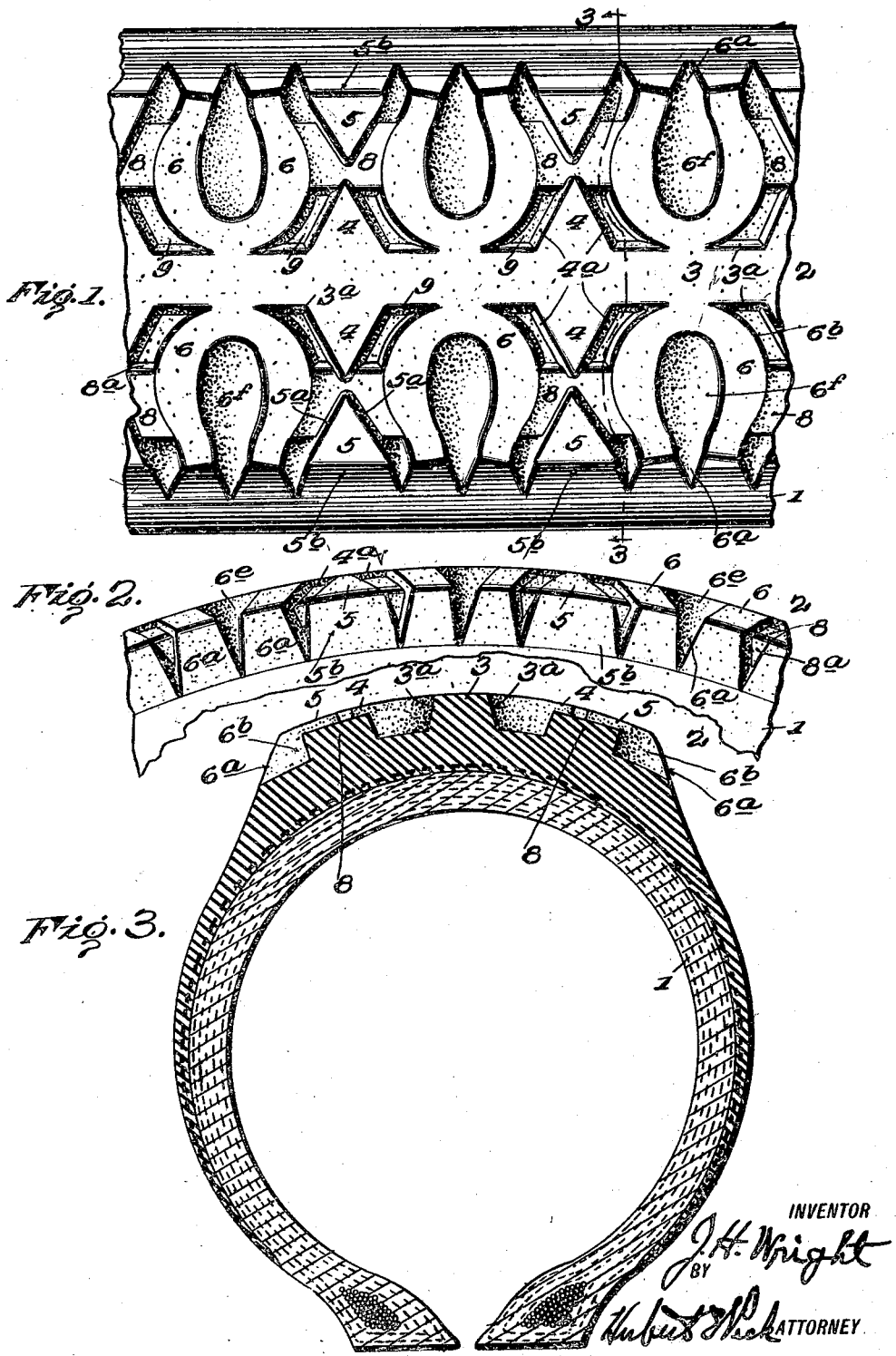

Patented June 17, 1924.

1,498,336

UNITED STATES PATENT OFFICE.

JOSEPH H. WRIGHT, OF RACINE, WISCONSIN, ASSIGNOR TO RACINE AUTO TIRE COMPANY, OF RACINE, WISCONSIN, A CORPORATION OF WISCONSIN.

VEHICLE-WHEEL TIRE AND CASING.

Application filed July 19, 1921. Serial No. 485,793.

*To all whom it may concern:*

Be it known that I, JOSEPH H. WRIGHT, a citizen of the United States of America, and resident of Racine, county of Racine, Wisconsin, have invented certain new and useful Improvements in and Relating to Vehicle-Wheel Tires and Casings, of which the following is a specification.

This invention relates to certain improvements in elastic material anti-skid treads for vehicle wheel tires and casings; and the objects and nature of the invention will be readily understood by those skilled in the art in the light of the following explanations of the accompanying drawings illustrating what I now believe to be the preferred mechanical expression or embodiment of my invention from among other forms and arrangements within the spirit and scope thereof.

An object of the invention is to provide an anti-skid tread composed of rubber or other suitable resilient elastic material, of maximum wearing, traction, and anti-skid qualities by reason of improved formations and arrangements of lugs, and other elevations.

With these and other objects in view, the invention consists in certain novel features in construction, formation and arrangement.

Referring to the accompanying drawings:

Fig. 1 is a top plan of a section of a tire embodying my invention.

Fig. 2 is a side elevation of such tire tread.

Fig. 3 is a cross section on the line 3—3, Fig. 1.

In the drawings, I show in part, a vehicle tire (and by the term tire, I means a solid, cushion or pneumatic tire or a so-called casing that receives the inner tube) which in the example illustrated happens to be a tire casing built up of elastic material such as rubber and fabric, and by the term fabric I include cords or threads, as well as canvas or the like.

On the so-called carcass 1 of the tire I build the tread so as to become an integral part of the carcass as is well understood by those skilled in the art. This tread 2 is composed of elastic material (such as rubber) in the form of numerous more or less closely arranged elevated lugs and projections, and my invention resides in the peculiar formation and arrangement of such lugs and projections to attain certain definite objects and results.

In the particular form shown, the tread embodies a central elevated longitudinal bar or rib 3 that is continuous throughout the tread. This central rib embodies a mass of rubber of substantial width and depth (elevation) to provide a substantial usually-flat continuous road engaging surface and abrupt longitudinal edge walls $3^a$.

This central rib is formed at uniformly spaced intervals with lateral enlargements 4, in this instance forming what might be termed triangular or outwardly tapering projections or lugs. Each lug is of approximately the same elevation as the central rib of which it forms a part, and is composed of a substantial mass of rubber and presents abrupt outwardly converging edge walls $4^a$. These lugs 4 are arranged in pairs, the lugs of a pair being alined and projecting laterally in opposite directions from the opposite longitudinal sides of the central rib. Each lug extends about one half the distance from the central rib to the adjacent side edge of the tread.

Outwardly beyond and alined with each pair of opposit projections 4, I provide a pair of alined lugs 5 arranged along the opposite longitudinal edges of the tread. Each elastic lug 5, in this example, is usually triangular in form with abrupt side edge walls $5^a$ converging inwardly of the tread toward the adjacent projection 4. The outer ends or bases of these side lugs 5 present abrupt usually beveled edge walls $5^b$ forming portions of the edge walls of the tread. Each lug 5 is preferably of the same elevation above the tire carcass as the central rib and its side projections and presents a usually flat road engaging surface of substantial area.

Comparatively large approximately U-shaped or semi-annular elastic lugs 6 are arranged at opposite sides of the central rib intervening between the transverse rows of projections 4 and lugs 5. Each large lug 6 is composed of a substantial mass of rubber and is approximately of the same elevation as the central rib and the lugs 5 and projections 4, and presents a usually flat wide top road engaging surface. Each said semi-annular lug at its closed or inner end joins and is anchored to the center rib and extends laterally therefrom to the adjacent edge of the tread where the curved or oppositely bowed walls or legs converge to within a short distance of each other to provide a comparatively narrow lateral opening or outlet 6ª through the side edge of the tread from the cup or deep depression 6ᶠ formed by the encircling wall of the lug. The exterior of the lug forms abrupt walls 6ᵇ transversely of the tread while the extremities of the lug form abrupt edge walls or shoulders 6ª along the edge of the tread, and the interior of the lug forms an abrupt edge or wall 6ᵉ both longitudinally and transversely of the tread.

The semi-annular lugs form semi-suction cups or depressions 6ᶠ, in that the outer ends of each lug when engaging the road surface and partially carrying the load, spread laterally under compression to close or partially close the lateral opening 6ª, with a resulting momentary reduction of pressure within the cup and consequent tendency to increase the grip of the tread on the road surface. However, the formation of the cup and its lateral outlet 6ª is such as to permit rapid flow of air from and to the cup while the cup is under partial compression and thereby prevent the generation of objectionable noises and the tendency to separate the tread from the carcass, both of which objectionable results are incidental to the use of treads embodying or made up of fully-effective suction cups, as will be understood by those skilled in the art.

The semi-annular lugs are arranged in two rows circumferentially around the tire, one row on one side of the continuous center rib and the other row on the opposite side of said rib, with each lug having a lateral opening through the adjacent edge of the tread. Each semi-annular lug is spaced from the adjacent transverse rows of projections 4 and lugs 5 to form intervening road gripping depressions, and to leave the edge walls 6ᵇ, 3ª, 4ª, 5ª, free to act in holding the tread against transverse and longitudinal slipping on the road surface.

I provide two longitudinal rows of alined depressed longitudinal elastic bars 8 at opposite sides of the continuous center rib and parallel therewith, with each row located about midway between the center rib and the adjacent side edge of the tread. These bars 8 form an integral part of the tread and join the semi-annular lugs of each row of such lugs but do not traverse such lugs, i. e. do not extend across the lugs and the cups or depressions formed thereby. At its ends, each bar 8 joins and anchors to the exterior walls of the adjacent semi-annular lugs and performs the functions of bracing such lugs and aiding to anchor such lugs in the tread and particularly of stiffening such lugs against spreading outwardly when under compression but leaving such lugs free to spread inwardly to close the side openings 6ª as hereinbefore described.

Each bar 8 also joins and anchors to the reduced ends of the projection 4 and lug 5 that intervene between a pair of semi-annular lugs. The bars thus serve to brace and stiffen such projections and lugs against excessive wear and aids in anchoring such lugs in the tread. These bars also present abrupt longitudinal edge walls 8ª that tend to aid the tread against lateral slip on the road surface. These anchoring and stiffening bars 8 usually present flat plain top faces of substantial area but these top surfaces are depressed below the top road engaging surfaces of the various lugs, projections and rib inasmuch as the elevation of said bars is slightly less than the elevation of said lugs, projections and rib. The outer surfaces of said bars are hence below the road engaging surface of the tread. The outer surfaces of said bars are usually depressed about from one eighth to one quarter of an inch according to the size of the tire.

These bars are sunken or depressed to leave portions of the edge walls of the lugs and projections elastic and exposed above the top surfaces of the bars, to function in gripping the road surface, and also to prevent the formation of complete or fully effective suction cups at the depressions 9 between the projections 4, semi-annular lugs, center rib and bars. The depressed top surfaces of the bars permit passage of air to said depressions 9 even when the lugs and projections are under compression, to prevent the complete suction cup action hereinbefore referred to. The depressions 9, however, perform important road gripping functions, and act as semi-vacuum cups in that to a slight extent minus pressure momentarily exists therein as the tread progresses, particularly over some kinds of road surfaces.

However, without reference to the semi-vacuum cup functions performed by the cups 6ᶠ and 9, these features are formed and arranged to take hold of the road surface in a most effective manner to prevent side as well as longitudinal slip.

The side edges of the tread formed by the two rows of spaced vertically extensive abrupt beveled walls 5ᵇ, and 6ª, are also very effective in tending to overcome side slip of the tread on the road surface. In this tread, I have attained maximum wearing qualities by reason of the great mass of rubber present in the multiplicity of more or less closely arranged lugs, projections, bars and rib, while maximum traction and anti-skid qualities are attained by the numerous depressions and variously arranged abrupt elastic edge walls.

It is evident that various changes, modifications and variations might be resorted to in the shapes, designs and arrangements of the structural function performing parts without departing from the spirit and scope of my invention, as defined by the following claims, and hence I do not wish to limit myself to the exact disclosures hereof or to matters of design.

What I claim is:

1. A tire having a tread composed of elastic material and embodying rows of uniformly-distributed spaced lugs and numerous closely-arranged road engaging elevations intervening between and closely arranged with respect to the lugs to provide intervening depressions, the lugs and elevations providing numerous variously arranged transverse and longitudinal abrupt edge walls and rows of alined abrupt edge walls forming the opposite side edges of the tread, said lugs forming road gripping cups with lateral outlets, the adjacent walls of the said lugs formed to spread under compression to approximately close said outlets, said elevations including relatively-depressed stiffening and anchoring bars joining adjacent lugs.

2. A tire having a tread composed of elastic material, the road engaging surface of said tread being formed by closely arranged connected transverse and longitudinal elevations embodying lugs forming cups with narrow lateral outlets arranged to be closed and opened by compression and expansion of portions of the lug walls, and relatively depressed anchoring and stiffening bars joining adjacent lugs.

3. A tire having a tread composed of elastic material and embodying elevated approximately U-shaped lugs forming cups having narrow lateral outlets along the side edges of the tread, and depressed bars exteriorly of said cups and bracing the lugs against spreading under compression to enlarge said outlets.

JOSEPH H. WRIGHT.